United States Patent Office 3,235,467
Patented Feb. 15, 1966

3,235,467
PROCESS FOR THE PRODUCTION OF
β-CAROTENE
Leon Ninet and Jacques Albert Renaut, Paris, and Robert Charles Francois Tissier, Maisons-Alfort, France, assignors to Rhone-Poulenc S.A., Paris, France, a corporation of France
No Drawing. Filed June 5, 1963, Ser. No. 285,574
Claims priority, application France, June 5, 1962,
899,751
9 Claims. (Cl. 195—28)

The present invention relates to the production of β-carotene by fermentation.

β-Carotene can be obtained by the submerged fermentation of microorganisms of the Choanephora or Blakeslea type. A variety of conditions favour the production of β-carotene. Barnett et al. [Science, 123, 141 (1956)] showed that the production of β-carotene was improved by the simultaneous culture of opposite (+ and —) forms of one species. It has also been found that the addition to the nutrient medium of whole or hydrolysed grain, vegetable oils, surface-active agents, antioxidants or thickening agents increases the yield of β-carotene [R. Anderson et al., J. Agr. Food. Chem. 6, 543 (1958); A. Ciegler et al., App. Microb. 7, 94 and 98 (1959)]. Moreover, MacKinney et al. [J. Am. Chem. Soc. 74, 3456 (1952)] have shown that the addition of β-ionone to the static culture of a Phycomyces greatly increased the formation of β-carotene, to the detriment of the formation of other carotenoid pigments. Anderson et al. (loc. cit.) noted the same effect in agitated cultures of Blakeslea and Choanephora microorganisms. β-Ionone can be replaced by other compounds such as 2,2,6 - trimethylcyclohexanone.

It has now been found that the addition of certain other compounds to the nutrient media causes an appreciable increase in the rate of production of β-carotene.

According to the present invention, a process for the production of β-carotene comprises culturing aerobically the + and — forms of *Blakeslea trispora* in a nutrient medium containing an activator which is either (a) an amide of the formula:

$$RCONR_1R_2 \qquad (I)$$

in which R represents hydrogen, an alkyl radical containing up to 6 carbon atoms, an aryl or an aralkyl radical, and $R_1$ and $R_2$, which may be the same or different, represent hydrogen or alkyl radicals containing up to 4 carbon atoms, (b) an imide of the formula:

(II)

in which $R_3$ represents a divalent aliphatic hydrocarbon radical containing up to 8 carbon atoms and X represents hydrogen or halogen or an alkyl or hydroxyalkyl radical containing up to 4 carbon atoms, (c) a lactam of the formula:

(III)

in which $R_3$ is as hereinbefore defined, or (d) a sulphoxide of the formula:

$$R_4SOR_5 \qquad (IV)$$

in which $R_4$ and $R_5$, which may be the same or different, represent alkyl radicals containing up to 4 carbon atoms.

Preferred activators are: of Formula I, dimethylformamide, acetamide, dimethylacetamide, propionamide, butyramide; of Formula II, succinimide, N-bromosuccinimide, N-hydroxymethylsuccinimide; of Formula III, caprolactam and α-pyrrolidone; and of Formula IV, dimethylsulphoxide.

These activators are ordinarily added to the nutrient medium in quantities from 0.1 to 10 g./litre, at the start of or during fermentation, in one or several portions. It is preferred to use a quantity between 0.5 and 2 g./litre of the compounds of Formulas I and IV, 2 to 6 g./litre of the compounds of Formula II, and 0.5 to 6 g./litre of the compounds of Formula III, or of a mixture of these different compounds. The addition is preferably made to the starting culture. Whatever the quantity added and the moment of adding the activator, it is advisable to continue the culture for 6 to 10 days after seeding in order to obtain the maximum production of β-carotene. The nutrient medium may vary in composition, but must contain assimilable sources of carbon and nitrogen, mineral salts and, optionally, also growth factors, antioxidants, surface-active agents, thickening agents and β-carotene precursors.

As assimilable carbon source, it is possible to use carbohydrates such as glucose, dextrins, starch, or animal or vegetable oils, such as lard oil or soya oil or cotton seed oil. Suitable sources of assimilable nitrogen are extremely varied: they can be chemically pure substances or complex substances containing nitrogen principally in protein form, such as casein, lactalbumin, gluten and their hydrolysates, soya and peanut flours, yeast extracts, distillers' solubles, and corn-steep.

Certain of the mineral salts which may be added can have a buffering or neutralising effect, such as the alkali or alkaline earth metal phosphates.

Among the growth factors most frequently employed is vitamin $B_1$, or thiamine. Among the antioxidants, there may be mentioned N,N'-diphenyl-p-phenylenediamine, 2,2,4 - trimethyl - 6 - ethoxy - 1,2 - dihydroquinoline, ascorbic acid and sorbic acid. The surface-active agents are preferably of the non-ionic type, such as derivatives of sorbitol with fatty acids, or products based on ethylene oxide condensates. Among the thickening agents, those most usually employed are starch, carboxymethyl cellulose, and agar.

As β-carotene precursor, it is possible to employ one or more of β-ionone, 2,2,6-trimethyl-cyclohexanone, and the derivatives of this ketone, such as the semicarbazone, oxime and hydrazone.

The culture medium is seeded with the + and — forms of *Blakeslea trispora* (NRRL 2456 and 2457 respectively). The increase in the rate of production of β-carotene in the presence of one of the above-defined activators depends on the precise working conditions; but the increase is still found, whether or not antioxidants or β-carotene precursors are added to the culture media.

The following non-limitative examples illustrate the invention.

Example 1

A culture medium A is prepared as follows: 500 cc. of water containing 75 g. of distillers' solubles are boiled for 15 minutes. After cooling, there are added:

| | |
|---|---|
| Maize starch _____ g__ | 50 |
| Soya oil _____ cc__ | 30 |
| Cotton oil _____ cc__ | 30 |
| Tween 80 (a surface active agent) _____ cc__ | 5 |
| Yeast extract _____ g__ | 1 |
| Monopotassium phosphate _____ g__ | 0.5 |
| Thiamine hydrochloride _____ g__ | 0.01 |

The volume is made up to 1000 cc. with distilled water. The mixture is then adjusted to pH 6.0 with sodium hydroxide and portioned out into 300 cc. Erlenmeyer flasks (50 cc. per flask). The flasks are then sterilized for 20 minutes at 120° C. and, after sterilization and cooling, 0.5 cc. of petroleum is added under sterile conditions to each flask.

A culture medium B is prepared in the same way, except that 4 g./l. of dimethylformamide (DMF) is added.

Each flask is then seeded with 5 cc. of an agitated culture 24 hours old containing both the + and − forms of *Blakeslea trispora* (NRRL 2456 and NRRL 2457). The flasks are then placed on a rotary agitation table rotating at 220 r.p.m. in a chamber at 27° C. After incubation for 2 days, 0.5 cc. of sterile petroleum is added to each flask. The cultures are maintained under the same conditions for another 8 days. After this time, the production of $\beta$-carotene is at its maximum in all the flasks.

The $\beta$-carotene content of each flask is measured as follows; the mycelium is separated by filtration, washed with water, and then dried overnight at 35° C. in vacuo. The dry mycelium is extracted with hexane, and the $\beta$-carotene is separated from the other carotenoids present by chromatography of the extract on alumina. The elution fractions containing $\beta$-carotene are combined and their $\beta$-carotene content measured by a spectrophotometer by reference to a pure sample of $\beta$-carotene.

The culture on medium A contained 425 mg./l. of $\beta$-carotene, and that on medium B 529 mg./l. of $\beta$-carotene.

Example 2

The media A and B are prepared and seeded as in Example 1. After incubation for 2 days under the conditions described in Example 1, 50 mg. of 2,2,6-trimethylcyclohexanone (TMCH) in solution in 0.5 cc. of petroleum are added under sterile conditions to each flask. After this addition, the cultures are kept under the same conditions of temperature and agitation for another 8 days.

By measuring the $\beta$-carotene as in Example 1, it is calculated that the yields obtained are as follows:

| | Mg./l. |
|---|---|
| Medium A+TMCH | 455 |
| Medium B+TMCH | 550 |

Example 3

The media A and B are prepared and seeded as in Example 1. After incubation for 2 days under the conditions described in Example 1, 50 mg. of $\beta$-ionone in solution in 0.5 cc. of petroleum are added under sterile conditions to each flask. After this addition, the cultures are continued under the same conditions of temperature and agitation for another 8 days.

By measuring the $\beta$-carotene as in Example 1, it is calculated that the yields obtained are as follows:

| | Mg./l. |
|---|---|
| Medium A+$\beta$-ionone | 770 |
| Medium B+$\beta$-ionone | 885 |

Example 4

A medium C is prepared in the manner referred to for medium A in Example 1, but after sterilization and cooling 0.5 cc. of a sterile 1% solution of 2,2,4-trimethyl-6-ethoxy-1,2-dihydroquinoline in petroleum is added to each flask in place of petroleum by itself.

A medium $D_2$ is also prepared in the same way as medium A in Example 1, but with the addition of 2 g./l. of dimethylformamide with the starch, the oils and the other constituents of the nutrient medium. After sterilization and cooling 0.5 cc. of a 1% sterile solution of 2,2,4-trimethyl-6-ethoxy-1,2-dihydroquinoline in petroleum is added to each flask.

The media C and $D_2$ are then seeded and the cultures are developed as in Example 1. After incubation for 2 days, 0.5 cc. of petroleum is added under sterile conditions to each flask. After this addition the cultures are continued under the same conditions of temperature and agitation for another 8 days.

The yields of $\beta$-carotene obtained are as follows:

| | Mg./l. |
|---|---|
| Medium C | 440 |
| Medium $D_2$ | 735 |

Example 5

The media C and $D_2$ are prepared and seeded in the manner stated in Example 4. After incubation for 2 days, under the conditions described in Example 1, 50 mg. of 2,2,6-trimethylcyclohexanone (TMCH) in solution in 0.5 cc. of petroleum are added under sterile conditions to each flask. The cultures are then continued for another 8 days.

The yields of $\beta$-carotene obtained are as follows:

| | Mg./l. |
|---|---|
| Medium C+TMCH | 650 |
| Medium $D_2$+TMCH | 840 |

Example 6

The medium C and the medium $D_2$ are prepared as indicated in Example 4. There is also prepared a medium $D_1$ and a medium $D_4$ as indicated in respect of medium A in Example 1, but with addition respectively of 1 g./l. and 4 g./l. of dimethylformamide to the starch, oils and other constituents of the nutrient medium. After sterilization and cooling, each flask also has added thereto 0.5 cc. of a 1% sterile solution of 2,2,4-trimethyl-6-ethoxy-1,2-dihydroquinoline in petroleum.

The media C, $D_1$, $D_2$, $D_4$ are seeded as indicated in Example 1. After incubation for 2 days under the conditions described in Example 1, 50 mg. of $\beta$-ionone in solution in 0.5 cc. of petroleum are added under sterile conditions to each flask. After this addition, the cultures are continued under the same conditions of temperature and agitation for another 8 days.

The yields of $\beta$-carotene obtained are as follows:

| | Mg./l. |
|---|---|
| Medium C+$\beta$-ionone | 1045 |
| Medium $D_1$+$\beta$-ionone | 1220 |
| Medium $D_2$+$\beta$-ionone | 1275 |
| Medium $D_4$+$\beta$-ionone | 1265 |

Example 7

A medium E is prepared as stated for medium A in Example 1, but with the addition of 100 mg./l. of N,N'-diphenyl-p-phenylene-diamine (DPPD) to the starch, oils and other constituents of the nutrient medium. After sterilization and cooling 0.5 cc. of petroleum is added under sterile conditions to each flask, as in the preparation of medium A.

A medium F is prepared in the same manner as indicated for medium A in Example 1, but with addition of 100 mg./l. of DPPD and 4 g./l. of dimethylformamide to the starch, oils and other constituents of the nutrient medium. After sterilization and cooling, 0.5 cc. of petroleum is added under sterile conditions to each flask as in the preparation of medium A.

The media E and F are seeded as indicated in Example 1. After incubation for 2 days under the conditions described in Example 1, 0.5 cc. of sterile petroleum is added to each flask. After this addition, the cultures are continued under the same conditions of temperautre and agitation for another 8 days.

The yields of β-carotene obtained are as follows:

| | Mg./l. |
|---|---|
| Medium E | 435 |
| Medium F | 525 |

*Example 8*

The media E and F are prepared and seeded as stated in Example 7. After incubation for 2 days under the conditions described in Example 1, each culture flask is given in sterile manner 50 mg. of 2,2,6-trimethylcyclohexanone in solution in 0.5 cc. of petroleum. After this addition, the cultures are continued under the same conditions of temperature and agitation for another 8 days.

The yields of β-carotene obtained are as follows:

| | Mg./l. |
|---|---|
| Medium E+TMCH | 585 |
| Medium F+TMCH | 735 |

*Example 9*

The media E and F are prepared and seeded as indicated in Example 7. After incubation for 2 days under the conditions described in Example 1, 50 mg. of β-ionone in solution in 0.5 cc. of petroleum are added under sterile conditions to each flask. After this addition, the cultures are continued under the same conditions of temperature and agitation for another 8 days.

The yields of β-carotene obtained are as follows:

| | Mg./l. |
|---|---|
| Medium E+β-ionone | 785 |
| Medium F+β-ionone | 1085 |

*Example 10*

A medium C is prepared as indicated in Example 4. A medium G is also prepared in the manner indicated for medium A in Example 1, but with addition of 4 g./l. of dimethylsulphoxide (DMS) to the starch, oils and other constituents of the nutrient medium. After sterilization and cooling each flask has added thereto, under sterile conditions, as in the preparation of medium C, 0.5 cc. of a 1% solution of 2,2,4-trimethyl-6-ethoxy-1,2-dihydroquinoline in petroleum.

The media C and G are seeded as described in Example 1. After incubation for 2 days under the conditions described in Example 1, 50 mg. of β-ionone in solution in 0.5 cc. of petroleum are added under sterile conditions to each flask. After this addition, the cultures are continued under the same conditions of temperature and agitation for another 8 days.

The yields of β-carotene obtained are as follows:

| | Mg./l |
|---|---|
| Medium C+β-ionone | 960 |
| Medium G+β-ionone | 1040 |

*Example 11*

A medium C is prepared as indicated in Example 4. A medium H is also prepared as described for medium A in Example 1, but with addition of 2 g./l. of acetamide to the starch, oils and other constituents of the medium. After sterilization and cooling each flask has added thereto in sterile manner, as in the preparation of medium C, 0.5 cc. of a 1% solution of 2,2,4-trimethyl-6-ethoxy-1,2-dihydroquinoline in petroleum.

The media C and H are seeded as described in Example 1. After incubation for 2 days under the conditions described in Example 1, 50 mg. of β-ionone in solution in 0.5 cc. of petroleum are added under sterile conditions to each flask. After this addition, the cultures are continued under the same conditions of temperature and agitation for another 8 days.

The yields of β-carotene obtained are as follows:

| | Mg./l. |
|---|---|
| Medium C+β-ionone | 1040 |
| Medium H+β-ionone | 1245 |

*Example 12*

A medium C is prepared as in Example 4. The media K, L and N are also prepared as described for medium A in Example 1 but with addition of the following to the starch, oils and other constituents:

Medium K _____ 2 g./l. of dimethylacetamide.
Medium L _____ 2 g./l. of propionamide.
Medium _____ 2 g./l. of butyramide.

After sterilization and cooling 0.5 cc. of a 1% solution of 2,2,4-trimethyl-6-ethoxy-1,2-dihydroquinoline in petroleum is added to each flask under sterile conditions, as in the preparation of medium C.

The media C, K, L and N are seeded as described for Example 1. After incubation for 2 days under the conditions described in Example 1, 50 mg of β-ionone in solution in 0.5 cc. of petroleum are added under sterile conditions to each flask. After this addition, the cultures are continued under the same conditions of temperature and agitation for another 8 days.

The yields of β-carotene obtained are as follows:

| | Mg./l. |
|---|---|
| Medium C+β-ionone | 1195 |
| Medium K+β-ionone | 1260 |
| Medium L+β-ionone | 1295 |
| Medium N+β-ionone | 1370 |

*Example 13*

The following are introduced into a fermenter with a capacity of 30 litres:

| | | |
|---|---|---|
| Distillers' solubles | g | 1125 |
| Water | litres | 11 |

The mixture is stirred and heated to 95° C. for 10 minutes. After cooling, the pH is adjusted to 6.25 with 60 cc. of 10 N sodium hydroxide and the medium is completed by addition of the following materials:

| | | |
|---|---|---|
| Maize starch | g | 750 |
| Soya oil | cc | 450 |
| Cotton oil | cc | 450 |
| Tween 80 | cc | 75 |
| Yeast extract | g | 15 |
| Monopotassium phosphate | g | 7.5 |
| Monohydrated manganese sulphate | g | 1.5 |
| Solution of thiamine hydrochloride (0.3 g./l.) | cc | 250 |

The volume is adjusted to 15.5 litres with water. The pH of the mixture is 6.20. The medium is sterilized for 50 minutes at 122° C. by injection of steam. After cooling, the pH is 5.7 and the volume is 15.5 litres.

1.5 g. of 2,2,4-trimethyl-6-ethoxy-1,2-dihydroquinoline in 150 cc. of petroleum are added under sterile conditions, and the medium is then seeded with 1.5 litres of an inoculum culture 49 hours old comprising the two forms of the *Blakeslea trispora* (NRRL 2456 and NRRL 2457). The culture is conducted at 27° C. with stirring with a turbine at 400 r.p.m. and aeration at a rate of 1.2 m.³/h. After 40 hours, 15 cc. of β-ionone in solution in 150 cc. of petroleum are added under sterile conditions. After this addition, the culture is continued under the same conditions of aeration, agitation and temperature for another 5 days.

The yield of β-carotene, measured as indicated in Example 1, is 1385 mg./l.

The medium described above is prepared in the same manner in another 30 litre fermenter. After sterilization and cooling there are added in sterile manner 1.5 g. of 2,2,4-trimethyl-6-ethoxy-1,2-dihydroquinoline in 150 cc. of petroleum and 30 cc. of dimethylformamide. The medium is then seeded under the conditions described above with the same inoculum culture. After 40 hours of culture 15 cc. of β-ionone in 150 cc. of petroleum are added under sterile conditions. After this addition, the culture is continued under the same conditions of aeration, agitation and temperature for another 5 days.

The yield of β-carotene obtained is 1620 mg./l.

*Example 14*

A culture medium C is prepared as described in Example 4. Culture medium P is prepared in the same manner but adding 4 g./l. of succinimide to the starch, oils and other constituents of medium C. After sterilization and cooling, each flask has added thereto 0.5 cc. of a 1% sterile solution of 2,2,4-trimethyl-6-ethoxy-1,2-dihydroquinoline in petroleum.

Each flask of the media C and P is seeded and incubated under the conditions described in Example 1. After 2 days of culture 0.5 cc. of petroleum is added under sterile conditions to each flask. The cultures are continued under the same conditions for another 8 days and after this time the yield of β-carotene is at its maximum in all the flasks.

The following results are obtained:

Mg./l. of β-carotene
Medium C _____ 490
Medium P _____ 580

*Example 15*

The media C and P are prepared and seeded as indicated in Examples 4 and 14.

After incubation for 2 days under the conditions described in Example 1, each flask has added thereto under sterile conditions 50 mg. of 2,2,6-trimethylcyclohexanone (TMCH) in solution in 0.5 cc. of petroleum. The cultures are continued for another 8 days under the same conditions. The yields of β-carotene obtained are as follows:

Mg./l.
Medium C+TMCH _____ 560
Medium P+TMCH _____ 690

*Example 16*

The media C and P are prepared and seeded as indicated in Examples 4 and 14. After incubation for 2 days under the conditions described in Example 1, each flask has added thereto under sterile conditions, 70 mg. of the semicarbazone of TMCH in the form of crystals and 0.5 cc. of petroleum. The cultures are continued for another 8 days under the same conditions.

The yields of β-carotene are as follows:

Mg./l.
Medium C+TMCH semicarbazone _____ 540
Medium P+TMCH semicarbazone _____ 640

*Example 17*

The media C and P are prepared and seeded as indicated in Examples 4 and 14. After incubation for 2 days under the conditions described in Example 1, each flask has added thereto under sterile conditions, 50 mg. of β-ionone in solution in 0.5 cc. of petroleum. After this addition, the cultures are continued under the same conditions of temperature and agitation for another 8 days. The yields of β-carotene obtained are as follows:

Mg./l.
Medium C+β-ionone _____ 880
Medium P+β-ionone _____ 1590

*Example 18*

The media C, $D_2$ and P are prepared in 300 cc. Erlenmeyer flasks as indicated in Examples 4 and 14. The medium Q is also prepared by addition of 2 g./l. of dimethylformamide and 3 g./l. of succinimide to the starch, oils and other constituents of medium C. After sterilization and cooling, each flask has added thereto 0.5 cc. of a 1% sterile solution of 2,2,4-trimethyl-6-ethoxy-1,2-dihydroquinoline in petroleum.

Each flask, seeded and incubated under the conditions described in Example 1, has added thereto under sterile conditions, after 2 days of culture, 50 mg. of β-ionone in solution in 0.5 cc. of petroleum. The cultures are continued for another 8 days under the same conditions of temperature and agitation.

The yields of β-carotene obtained are as follows:

Mg./l.
Medium C+β-ionone _____ 1125
Medium $D_2$+β-ionone _____ 1360
Medium Q+β-ionone _____ 1635
Medium P+β-ionone _____ 1700

*Example 19*

The following are introduced into a 30 litre fermenter:

Distillers' solubles _____g__ 1500
Water _____litres__ 11

The mixture is stirred and heated to 95° C. for 10 minutes. After cooling, the pH value is adjusted to 6.45 with 70 cc. of 10 N sodium hydroxide and the medium is completed by addition of the following materials:

"Fox head" starch _____g__ 750
Soya oil _____cc__ 450
Cotton oil _____cc__ 450
Tween 80 _____cc__ 75
Yeast extract _____g__ 15
Monopotassium phosphate _____g__ 7.5
2,2,4 - trimethyl - 6 - ethoxy - 1,2 - dihydroquinoline
 _____cc__ 1.5
Monohydrated manganese sulphate _____g__ 1.5
Thiamine hydrochloride solution (0.3 g./l.) ___cc__ 250

The volume is adjusted to 15 litres with water. The pH of the mixture is 6.40. The medium is sterilized for 50 minutes at 122° C. by injection of steam. After cooling, the pH value is 5.85 and the volume is 14.2 litres.

150 cc. of petroleum and 30 cc. of dimethylformamide are then added in sterile manner. The fermenter is then seeded with 750 cc. of an inoculum culture of the + form of *Blakeslea trispora* (NRRL 2456) and 750 cc. of an inoculum culture of − form of *Blakeslea trispora* (NRRL 2457), both cultures being 49 hours old.

The culture is continued at 27° C. with stirring with a turbine at 400 r.p.m. and aeration at a rate of 1.2 m.³/hour. After a culture period of 48 hours, 15 cc. of β-ionone in solution in 150 cc. of petroleum are added under sterile conditions. After this addition, the culture is continued under the same conditions of temperature, agitation and aeration for another 5 days. The yield of β-carotene is 965 mg./l.

The medium described above is prepared in the same manner in another 30 litre fermenter. After sterilization and cooling 150 cc. of petroleum and 60 g. of succinimide in solution in 500 cc. of water are added under sterile conditions. The medium is then seeded under the conditions described above with the same two inoculum cultures. After a development period of 48 hours, 15 cc. of β-ionone in solution in 150 cc. of petroleum are added under sterile conditions. After this addition, the culture is continued for another 5 days under the same conditions of temperature, agitation and aeration. The yield of β-carotene obtained is 1225 mg./l.

*Example 20*

A culture medium C is prepared as described in Example 4. A culture medium R is also prepared in the same way but adding 2 g./l. of N-bromosuccinimide to the starch, oils and other constituents of the medium. The media portioned out into 300 cc. Erlenmeyer flasks (50 cc. per flask) are sterilized and cooled. Each flask then has added thereto, as in the preparation of medium C, 0.5 cc. of a 1% solution of 2,2,4-trimethyl-6-ethoxy-1,2-dihydroquinoline in petroleum.

The culture flask of media C and R are seeded and incubated under the conditions described in Example 1. After incubation for 2 days, each flask has added thereto under sterile conditions 50 mg. of β-ionone in solution in 0.5 cc. of petroleum. After this addition the cultures are continued under the same conditions of temperature and agitation for another 8 days. The following yields of β-carotene are obtained:

| | Mg./l. |
|---|---|
| Medium C+β-ionone | 975 |
| Medium R+β-ionone | 1180 |

*Example 21*

A culture medium S is prepared in the following manner: 500 cc. of water, containing 90 g. of distillers' solubles, are boiled for 15 minutes. After cooling the following are added:

| | | |
|---|---|---|
| Maize starch | g | 60 |
| Soya oil | cc | 35 |
| Cotton oil | cc | 35 |
| Tween 80 | cc | 5 |
| Yeast extract | g | 1 |
| Monopotassium phosphate | g | 0.5 |
| Monohydrated manganese sulphate | g | 0.1 |
| Thiamine hydrochloride | g | 0.01 |

The volume is made up to 1000 cc. with distilled water. The mixture is adjusted to a pH value of 6.2 with sodium hydroxide, portioned out into 300 cc. Erlenmeyer flasks (50 cc. per flask) and then sterilized for 20 minutes at 120° C. After sterilization and cooling, each flask has added thereto 0.5 cc. of a 1% sterile solution of 2,2,4-trimethyl-6-ethoxy-1,2-dihydroquinoline in petroleum.

The culture medium T is prepared in the same manner as medium S, except that after sterilization and cooling each flask has added thereto 0.5 cc. of a 1% sterile solution of 2,2,4-trimethyl-6-ethoxy-1,2-dihydroquinoline in petroleum and 0.5 cc. of a 10% sterile solution of N-hydroxymethylsuccinimide in distilled water.

The culture flasks of media S and T are seeded and incubated under the conditions described in Example 1. After incubation for 2 days, each flask has added thereto under sterile conditions 50 mg. of β-ionone in solution in 0.5 cc. of petroleum. After this addition, the cultures are continued under the same conditions of temperature and agitation for another 8 days. The yields of β-carotene obtained are as follows:

| | Mg./l. |
|---|---|
| Medium S+β-ionone | 1135 |
| Medium T+β-ionone | 1485 |

*Example 22*

A culture medium V is prepared as follows: 500 cc. of water containing 60 g. of distillers' solubles are brought to boiling point for 15 minutes. After cooling, the following are added:

| | | |
|---|---|---|
| Starch | g | 60 |
| Soya oil | cc | 35 |
| Cotton oil | cc | 35 |
| Tween 80 | cc | 5 |
| Yeast extract | g | 1 |
| Monopotassium phosphate | g | 0.5 |
| Monohydrated manganese sulphate | g | 0.1 |
| Thiamine hydrochloride | g | 0.01 |

The volume is made up to 1000 cc. with distilled water. The mixture is adjusted to a pH value of 6.3 with sodium hydroxide, portioned out into 300 cc. Erlenmeyer flasks at the rate of 50 cc. per flask, and then sterilized for 20 minutes at 120° C. After sterilization and cooling each flask has added thereto 0.5 cc. of a 1% sterile solution of 2,2,4-trimethyl-6-ethoxy-1,2-dihydroquinoline in petroleum.

A culture medium W is prepared in the same manner but adding 1 g./l. of caprolactam with the starch, oils and other constituents of medium V. After sterilization and cooling, each flask has added thereto 0.5 cc. of a 1% sterile solution of 2,2,4-trimethyl-6-ethoxy-1,2-dihydroquinoline in petroleum.

Each flask of the media V and W, seeded and incubated under the conditions described in Example 1, is provided in sterile manner, after 2 days of culture, with 50 mg. of β-ionone in solution in 0.5 cc. of petroleum. The cultures are continued for another 8 days under the same conditions as regards temperature and agitation.

The yields of β-carotene, measured as indicated in Example 1, are as follows:

| | Mg./l. |
|---|---|
| Medium V+β-ionone | 1465 |
| Medium W+β-ionone | 1730 |

*Example 23*

The culture medium V is prepared in 300 cc. Erlenmeyer flasks in the same way as described in Example 22 above. The culture media X₁ and X₃ are also prepared in the same manner but adding 1 g./l. and 3 g./l. respectively of α-pyrrolidone with the starch, oils and other constitutents of medium V. After portioning out into Erlenmeyer flasks 50 cc. per flask, sterilization and cooling, each flask also has added thereto 0.5 cc. of a 1% sterile solution of 2,2,4-trimethyl-6-ethoxy-1,2-dihydroquinoline in petroleum.

Each flash is seeded and incubated under the conditions described in Example 1, and, after 2 days of culture, 50 mg. of β-ionone in solution in 0.5 cc. of petroleum are added under sterile conditions. The cultures are continued for another 8 days under the same conditions as regards temperature and agitation.

The yields of β-carotene obtained are as follows:

| | Mg./l. |
|---|---|
| Medium V+β-ionone | 1465 |
| Medium X₁+β-ionone | 1730 |
| Medium X₃+β-ionone | 1970 |

We claim:

1. Process for the production of β-carotene which comprises culturing aerobically and + and − forms of *Blakeslea trispora* in a nutrient medium containing in addition to assimilable sources of carbon, nitrogen, and mineral salts, an activator which is selected from the group consisting of dimethylformamide, acetamide, dimethylacetamide, propionamide, butyramide, succinimide, N-bromo-succinimide, N-hydroxymethylsuccinimide, caprolactam, α-pyrrolidone, and dimethylsulphoxide, and the said activator being present in said nutrient medium in amount from 0.1 to 10 g. per litre.

2. Process according to claim 1 in which the nutrient medium also contains a β-carotene precursor selected from 2,2,6-trimethylcyclohexanone, its semicarbazone, and β-ionone.

3. Process according to claim 1 in which the nutrient medium also contains an antioxidant selected from 2,2,4-trimethyl-6-ethoxy-1,2-dihydroquinoline and N,N' - diphenyl-p-phenylenediamine.

4. Process according to claim 1 in which the nutrient medium also contains thiamine.

5. Process according to claim 1 in which the activator is selected from dimethylformamide, acetamide, dimethylacetamide, propionamide, and butyramide, used in amount of 0.5 to 2 g. per litre of nutrient medium.

6. Process according to claim 1 in which the activator is selected from succinimide, N-bromosuccinimide, and N-hydroxymethylsuccinimide, used in amount of 2 to 6 g. per litre of nutrient medium.

7. Process according to claim 1 in which the activator is selected from caprolactam and α-pyrrolidone, used in amount of 0.5 to 6 g. per litre of nutrient medium.

8. Process according to claim 1 in which the activator is dimethylsulphoxide, used in amount of 0.5 to 2 g. per litre of nutrient medium.

9. In a process for the production of β-carotene by the aerobic culture of the + and − forms of *Blakeslea trispora* in a nutrient medium, the improvement which consists in adding to said nutrient medium, from 0.1 to 10 g. per litre of a member selected from the group consisting of dimethylformamide, acetamide, dimethylacetamide, propionamide, butyramide, succinimide, N-bromosuccinimide, N-hydroxymethylsuccinimide, caprolactam, α-pyrrolidone, and dimethylsulphoxide.

References Cited by the Examiner
UNITED STATES PATENTS
2,959,521   11/1960   Zajic _____ 195—28

OTHER REFERENCES

Ciegler et al.: Applied Microbiology, vol. 10, No. 2, March 1962, pp. 132–136.

A. LOUIS MONACELL, *Primary Examiner.*